(12) United States Patent
Yun

(10) Patent No.: US 6,185,012 B1
(45) Date of Patent: Feb. 6, 2001

(54) DEVICE AND METHOD FOR SCANNING IN A MULTIFUNCTIONAL MACHINE

(75) Inventor: Young-Jung Yun, Kyonggi-do (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/096,621

(22) Filed: Jun. 12, 1998

(30) Foreign Application Priority Data

Jun. 12, 1997 (KR) .................................................. 97-24237

(51) Int. Cl.[7] ....................................................... H04N 1/04
(52) U.S. Cl. .......................... 358/494; 358/471; 358/472; 358/474
(58) Field of Search ..................................... 358/496, 497, 358/474, 494, 471, 472; 399/211; 310/328

(56) References Cited

U.S. PATENT DOCUMENTS

| | | | |
|---|---|---|---|
| 4,999,717 | 3/1991 | Nagashima | 358/448 |
| 5,084,773 | 1/1992 | Yonenaga | 358/496 |
| 5,181,128 | 1/1993 | Fukatsu | 358/486 |
| 5,245,447 | 9/1993 | Stemmle | 358/472 |
| 5,335,091 | * 8/1994 | Palum | 358/474 |
| 5,396,142 | * 3/1995 | Koblanski | 310/328 |
| 5,430,550 | 7/1995 | Hashimoto et al. | 358/488 |
| 5,432,622 | * 7/1995 | Johnston et al. | 358/474 |
| 5,550,651 | 8/1996 | Terajima | 358/496 |
| 5,570,206 | 10/1996 | Yoshinaga | 358/497 |
| 5,640,251 | 6/1997 | Tone et al. | 358/482 |
| 5,646,746 | 7/1997 | Tazawa et al. | 358/471 |
| 5,671,069 | 9/1997 | Kodama | 358/474 |
| 5,687,010 | 11/1997 | Van Tilborg et al. | 358/496 |
| 5,689,347 | 11/1997 | Naoi | 358/444 |

* cited by examiner

Primary Examiner—Cheukfan Lee
(74) Attorney, Agent, or Firm—Robert E. Bushnell, Esq.

(57) ABSTRACT

Disclosed is a scanning method and apparatus for scanning documents in a multifunctional machine. A scanning sensor module moves along the main scanning axis of the apparatus in either a first direction or a second direction opposite the first direction along the same scan line. The scanning sensor module moves to any line in a sub scanning direction and scans the line. Then, the scanning sensor module moves to a second position and re-scans the line. Since the scanning along the main scanning axis is performed at least twice, the total amount of data collected is increased, thus increasing the resolution of the image that is recorded along the main scanning axis.

20 Claims, 8 Drawing Sheets

DEVICE AND METHOD FOR SCANNING IN A MULTIFUNCTIONAL MACHINE

CLAIM OF PRIORITY

This application makes reference to, incorporates the same herein, and claims all rights accruing thereto under 35 U.S.C. §119 through my patent application entitled Scanning Method in a Multifunctional Machine and Scanning Device Using the Method earlier filed in the Korean Industrial Property Office on the 12th day of June 1997 and there duly assigned Ser. No. 1997/24237.

BACKGROUND OF THE INVENTION

1. Field of the Invention

The present invention relates to a scanning device for scanning documents in a multifunctional machine and, more specifically, to a scanning method and apparatus that is capable of enhancing the recorded image resolution along the main scanning axis.

2. Background Art

A scanning device may include many components, such as an optical illumination system, a housing that maintains the document being scanned in a flat position, and a photographic optical system that focuses the light transmitted through, or reflected by, the document onto a reading device. Light from the illumination source is transmitted and optically focused in a line on the source document, and then light from the source document is focused on the reading device. This light is then read as a single line of data. Following the single line of data reading, the scanner moves the source document by a single line increment, changing the position of the original document. Typically, a scanning sensor module 'reads' a document using the same space frequency along both the main scanning axis, an axis perpendicular to the paper transport direction, and the sub scanning axis, an axis parallel to the paper transport direction. Thus, the reading accuracy along the sub scanning axis is affected by the pixel pitch, which makes it difficult to improve reading accuracy.

Some developments in scanning devices have been concerned with increasing the resolution of images by varying either the pixel clock or the projection lens used by the scanning device. Some techniques are shown, for example, in U.S. Pat. No. 5,671,069 to Kodama entitled Pixel Clock Generator, and U.S. Pat. No. 5,430,550 to Hashimoto entitled Image Reading Apparatus Which Corrects for Positional and Angular Deviation Between the Image Sensor and the Document. Reading accuracy has also been improved by reading a document with a greater spatial frequency along the sub scanning axis than along the main scanning axis, as detailed in U.S. Pat. No. 5,181,128 to Fukatsu entitled Method and Apparatus for Reading Image Using a Line Image Sensor.

Some developments have been geared towards scanning devices having only one scanning sensor module, as shown, for example, in U.S. Pat. No. 5,646,746 to Tazawa entitled image Input Device Having Carriage That Includes a Movable Origin Detector, that details using an origin sensor to allow a normal sized scanning sensor module to read longer than standard sized media. Another example is shown in U.S. Pat. No. 5,245,447 to Stemmle entitled Indexing Mechanism for Compact Scanner, that mentions a low cost, portable, and single carriage motor scanning device. U.S. Pat. No. 5,084,773 to Yonenaga entitled Image Reading Processing Apparatus, mentions a scanning sensor module that moves in one direction and then reverses to move in another direction to allow the editing of the originally read data.

Speed is an important factor when designing a scanning device. U.S. Pat. No. 5,640,251 to Tone entitled Image Reading Device, shows a reading small sized documents. U.S. Pat. No. 5,687,010 to Van Tilborg entitled Dual Motion Scanning Method and Apparatus Therefor, mentions a technique for performing a pre scan and a main scan that increases the scanning speed.

The use of multiple scanner sensor modules has facilitated improved performance in some scanning devices, albeit at the additional expense of multiple modules and more precise controlling methods. U.S. Pat. No. 4,999,717 to Nagashima entitled Image Reading Apparatus, shows a technique for using multiple line sensors to provide more image data, thus allowing the scanning device to edit out particular data while scanning. U.S. Pat. No. 5,689,347 to Naoi entitled Signal Processing Apparatus, mentions using two scanning sensor modules that are spaced a half line apart that output signals on separate channels to allow for data to be read out faster than it is put into storage without needing to increase the memory of the computer. U.S. Pat. No. 5,570,206 to Yoshinaga entitled Image Reading Apparatus, shows a plurality of scanning sensor modules mounted on a common carriage to increase the amount of information that can be stored without increasing the necessary scanning time.

A scanning device may be constructed using a timing belt for slidably driving a scanning sensor module. In addition, a slide shaft may be used to guide the moving of the scanning sensor module. The slide shaft is rotatably fixed in the frame of the scanning device.

A scanning operation by a scanner device having the above structure is performed along the main scanning axis and along the sub scanning axis. The scan resolution along a direction parallel to the sub scanning axis is dependent on the size of the incremental step that the scanning sensor module is moved by the step motor. On the other hand, the scan resolution obtainable along the main scanning axis is dependant on the particular resolution of the scanning sensor module. That is, if the scanning sensor module only has a resolution of 300 dots per inch, then the resolution of the scanner will not exceed 300 dots per inch along the direction of the main scanning axis. However, the scan resolution can exceed 300 dots per inch along the sub scanning axis.

Even though the maximum resolution in a direction parallel to the main scanning axis is dependant on the resolution of the scanning sensor, the overall resolution of the recorded document can be slightly increased by reducing the incremental movement of the scanning sensor module along the sub scanning axis. For example, when the resolution of the scanning sensor is 300 dots per inch, the amount of movement of the scanning sensor module along the sub scanning axis is $84.7\mu$ (⅟300 inch). In order to increase the resolution along the sub scanning axis to 600 dots per inch, approximately twice the regular resolution, the movement of the scanning sensor along the sub scanning axis is set to $42.35\mu$, approximately half the incremental step normally used. Unfortunately, since the resolution in a direction along the main scanning axis is dependant on the resolution of the scanning sensor, changing the incremental step of the scanning sensor module along the sub scanning axis is of marginal help. Data loss is often incurred in situations where black, or another color, occupies only 30% of a pixel. Since the value that is read by the scanning module is white, there is a data loss of 30%. Thus, even if two pixels were 30% black, the image value read and subsequently output to memory would be 0 (or white). As such, marginal data loss is often incurred.

The contemporary art does not provide a solution to marginal data loss for scanning devices with only one scanning sensor module. As such, I believe that it may be possible to improve on the contemporary art by providing an apparatus and a method for increasing the scanning resolution in the main scanning direction of a scanning device that uses only one scanning sensor module, that approximately doubles the scanning resolution along the main scanning axis, that does not require the use of multiple scanning sensor modules, and that is economical to manufacture.

SUMMARY OF THE INVENTION

Accordingly, it is an object of the present invention to provide an apparatus and a method for improving the data obtained by scanning devices having only one scanning sensor module.

It is another object to provide an apparatus and a method for reading documents in a scanning device having only one scanning sensor module that approximately doubles the scanning resolution along the main scanning axis.

It is still another object to provide an apparatus and a method for approximately doubling the resolution of a scanning device along the main scanning axis.

It is yet another object to provide an improved scanning device that uses only one scanning sensor module that is economical to manufacture.

These and other objects may be achieved by providing a method for scanning documents using a scanning sensor module, oriented in a first position, that moves to any point along the sub scanning axis and scans a line. After scanning the line, the scanning sensor module is moved into a second position. Then the module re-scans the line in a direction opposite from the first direction. The first position and the second position of the module are spaced apart by a half pixel difference along the main scanning axis. After the second scan of the line is completed, the scanning sensor module moves to the next line in the document.

A first embodiment of an apparatus as constructed according to the principles of present invention may include: a scanning device for moving the scanning sensor module along sub scanning axis; a slide shaft for guiding the movement of the scanning sensor module; and a unit which is located at one end of the slide shaft to move the scanning module from a first scanning position to a second scanning position that are space a predetermined distance apart along the main scanning direction. The device at one end of the slide shaft may be constructed using an eccentrically located shaft, that is eccentric by a distance equal to the distance the scanning sensor module moves in the main scanning direction when moving between the first and second position; a rotary lever that has one end fixed to the eccentrically located shaft of the slide shaft; a solenoid for moving the scanning sensor module in the main scanning direction by lowering the rotary lever and rotating the slide shaft; and an elastic element that biases the slide shaft to maintain the scanning sensor module in a first position when the solenoid is not activated.

A second embodiment of an apparatus for increasing the resolution of a scanning sensor module in the main scanning direction may use a motor for supplying the driving force to the above mentioned slide shaft; an eccentric cam that is mounted on the motor and located in contact with an upper surface of the rotary lever; and an encoder that regulates the rotation of the motor. Additionally, the encoder may include an encoder slit that is mounted on the eccentric cam; and an encoder sensor for sensing the rotational state of the eccentric cam.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
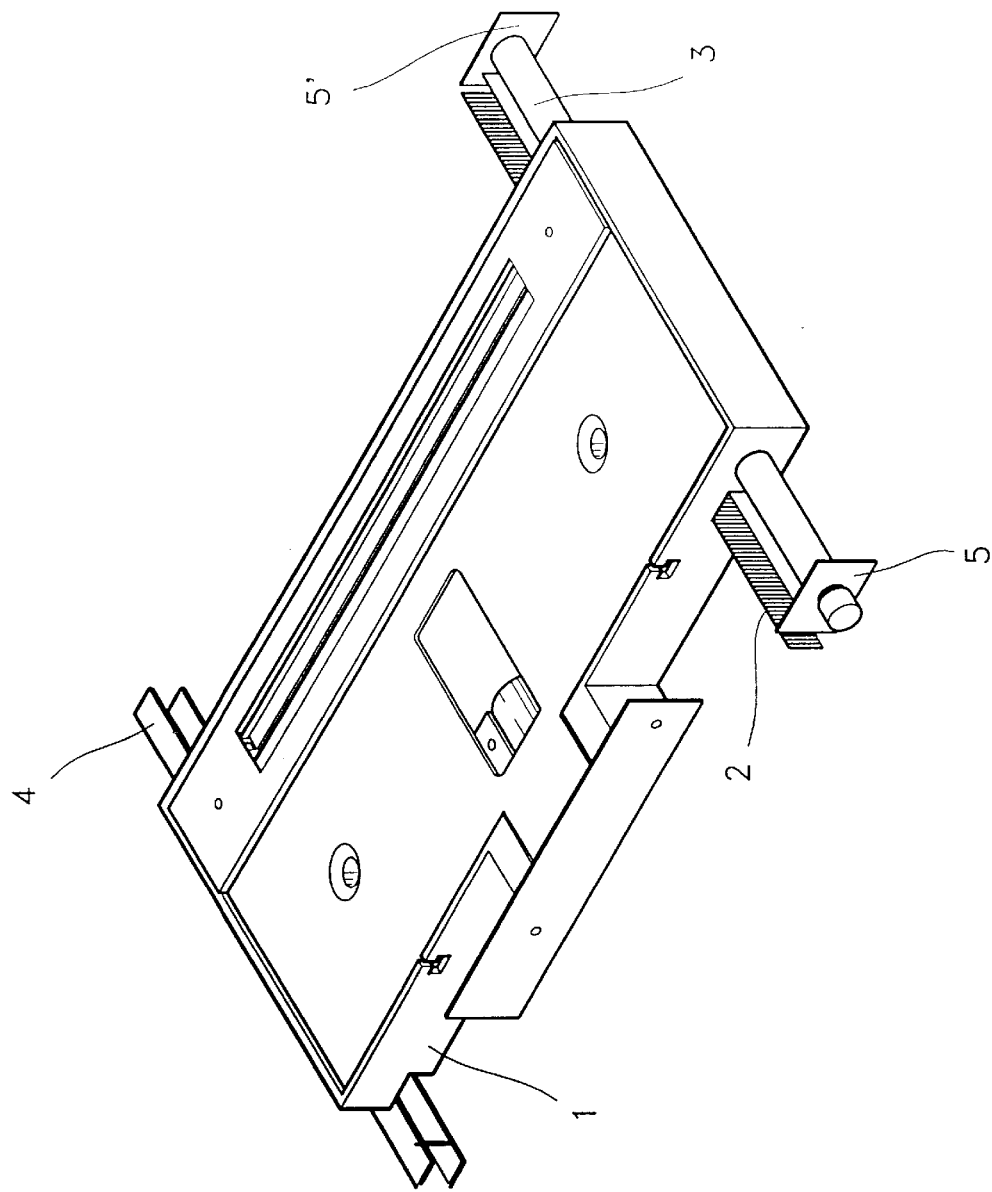
FIG. 1 is a perspective view of a scanning device of a multifunctional machine.

Referring now to the drawings and particularly to FIG. 1, which illustrates a scanning device to for reading image data from a document in a multifunctional machine. The scanning device has an image resolution of 300 dots per inch and an available number of pixels in one line of 2,550, for example for scanning binary data of 2,550 pixels. As shown in FIG. 1, the scanning device includes a scanning sensor module 1, a timing belt 2 for slidably driving the scanning sensor module 1 at one end for scanning operation, a slide shaft 3 for guiding the moving of the scanning sensor module 1, and a slide guide 4 for guiding a slide operation of the scanning sensor module 1. The slide shaft 3 is rotatably fixed at fixing frames 5 and 5'.

A scanning operation by the scanning device as shown in FIG. 1 is performed in a main scanning direction and a sub scanning direction. The scan resolution in the sub scanning direction which is the document transporting direction is decided by the movement amount of a step motor. On the other hand, the scan resolution in the main scanning direction is decided by the resolution of a scanning sensor. That is, in the case of the scanning sensor having the resolution of 300 dots per inch, the scan resolution of the scanner does not exceed 300 dots per inch in the main scanning direction and can exceed 300 dots per inch in the sub scanning direction.

In addition, since the maximum resolution in the main scanning direction is decided by the resolution of the scanning sensor, the resolution can increase by reducing the movement amount in the sub scanning direction. For example, when the resolution is 300 dots per inch, the amount of the scanning movement in the sub scanning direction is 84.7$\mu$ (1/300 inch). When the resolution is 600 dots per inch which is twice of 300 dots per inch, the movement of the scanning movement in the sub scanning direction is set to 42.35$\mu$ which is a half of 84.7$\mu$. However, since the resolution in the main scanning direction is decided by the resolution of the scanning sensor, it is impossible to change the resolution.

Figure 2:
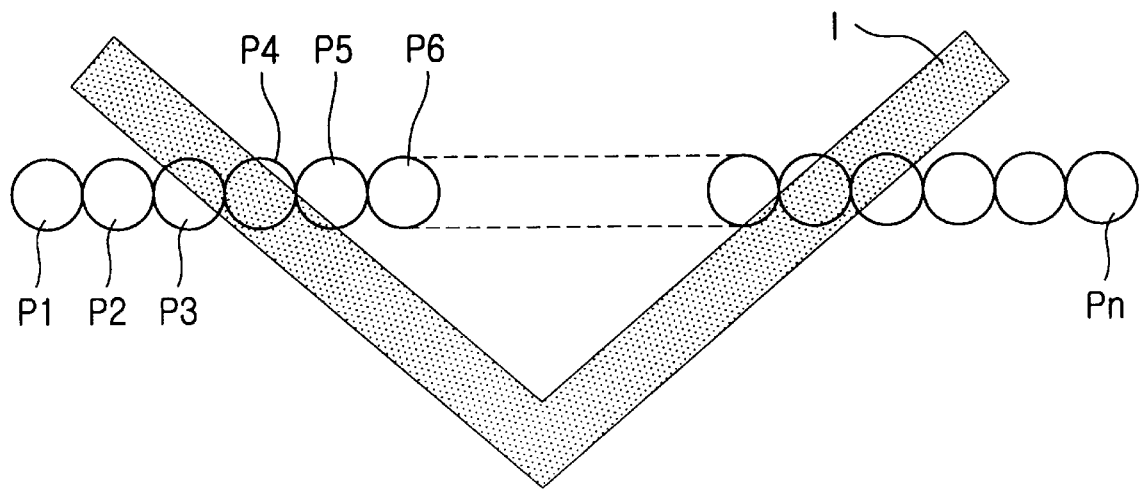
FIG. 2 is a view illustrating a position where a sensor senses an image during scanning.

In the multifunctional machine, when an image is scanned, the scanning sensor senses an image during scanning as shown in FIG. 2, the scanned values of each pixel is illustrated in the following table:

| Pixel Number | P1 | P2 | P3 | P4 | P5 | P6 | ... | Pn |
|---|---|---|---|---|---|---|---|---|
| Image Value | 0 | 0 | 0 | 1 | 0 | 0 | ... | 0 |
| Output Value | 0 | 0 | 0 | 1 | 0 | 0 | ... | 0 |

The thick black line denoted 1 represents light reflecting off of a black surface. As FIG. 2 clearly shows, when the scanning sensor module is in position P1 no black is detected and an image value of 0 is stored and sent out as an ouput value. The same situation occurs when the scanning sensor module is in positions P2 and P6. When the scanning module is in position P4 light reflecting from a black pixel is detected and an image value of 1 is stored and sent out as an output value. However, when the scanning sensor module is in position P3 or P5 only about 30% of the pixel contains black, or another color, and so the scanning sensor module stores the value of 0 as the image value and sends it out as an output value. This mis-identifying of the content of pixels P3 and P5 illustrates the common problem of data loss that can occur with scanning devices. This loss of data translates to a decrease in image resolution that becomes even more noticable when the scanned image is enlarged.

Figure 3:
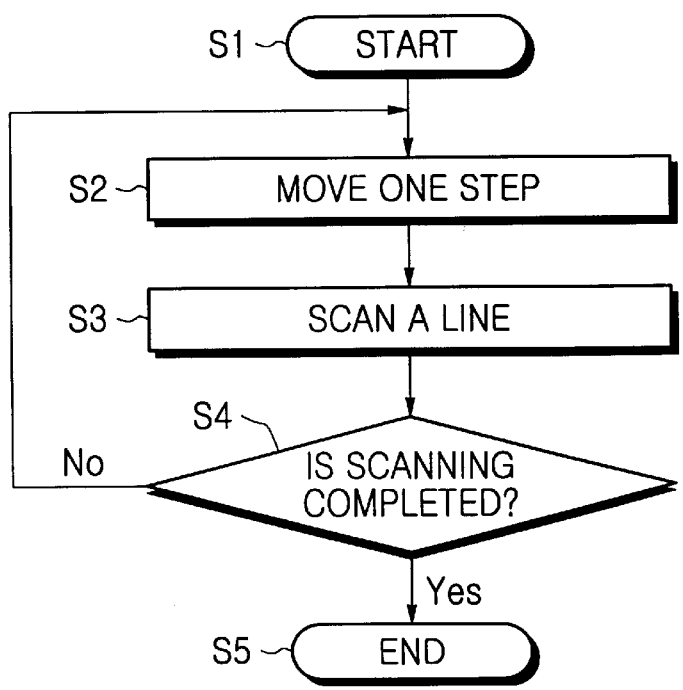
FIG. 3 is a flowchart illustrating a scanning operation.

FIG. 3 illustrates a method of scanning a document in a multifunctional machine. First, in step S1, the scanning device is started and the scanning sensor module is moved to a start position along the sub scanning axis over the document to be scanned. Then, during step S2, the scanning sensor module is moved an incremental step along the sub scanning axis. After, in step S3, a line along the main scanning axis of the document is scanned. In step S4 the scanning device determines if the document scanning is completed. If the document is not completely scanned then the method returns to step S2. If the scanning of the document is completed then the machine moves on to step S5 and ends the scanning process.

Figure 4:
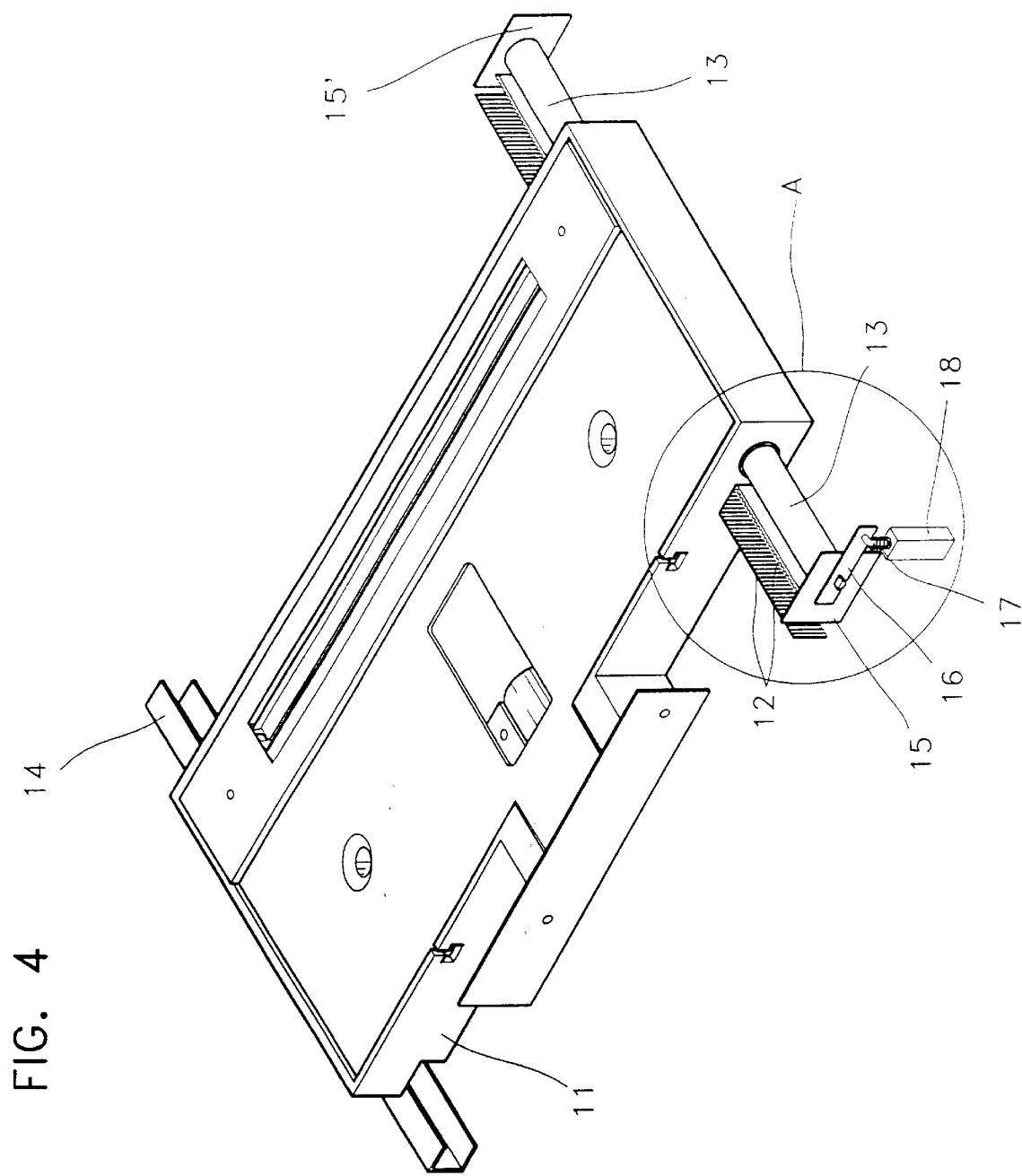
FIG. 4 is a perspective view of a scanning device as constructed according to a first embodiment of the present invention.
Figure 5:
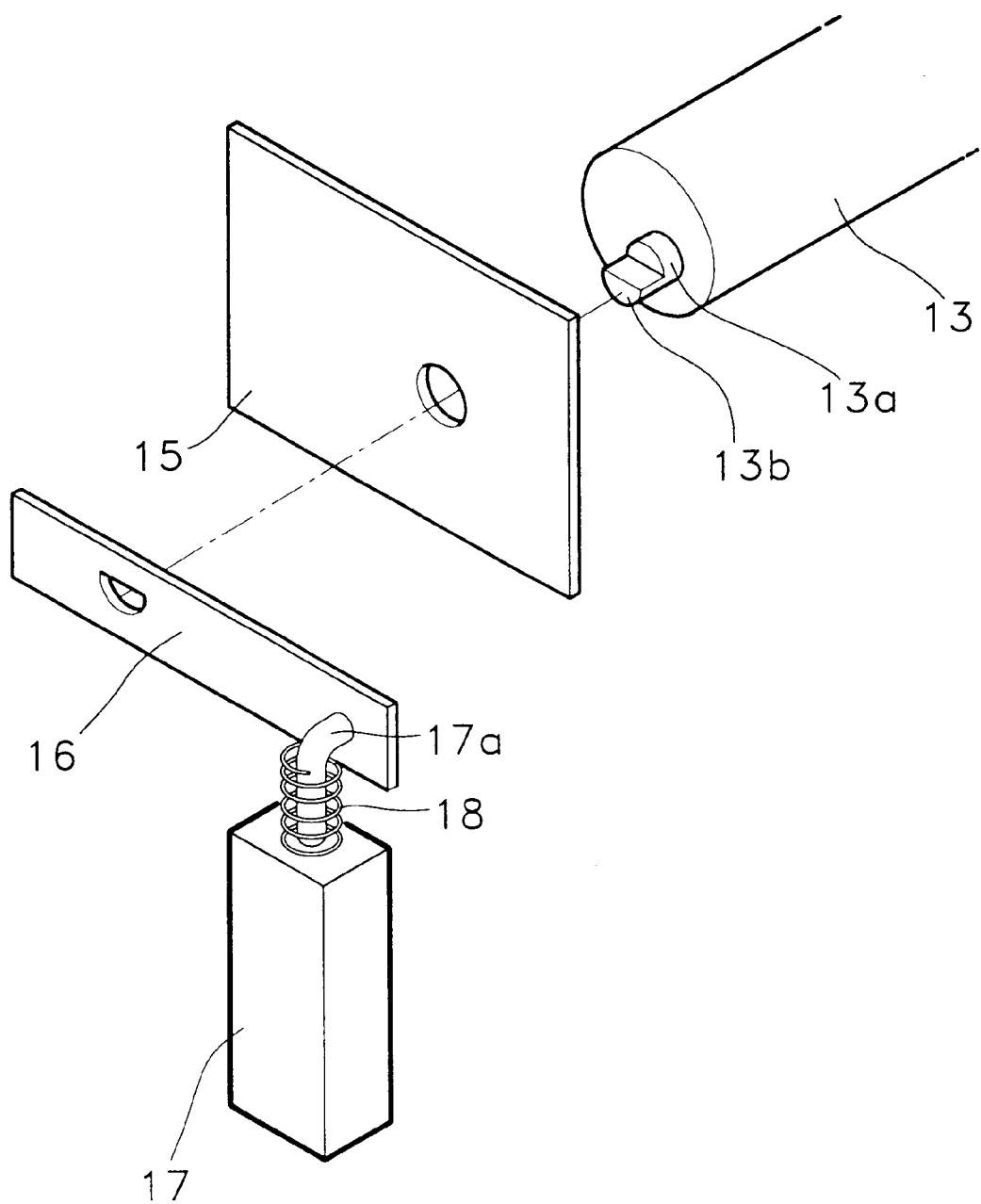
FIG. 5 is a perspective view illustrating the area denoted 'A' in FIG. 4.
Figure 6:
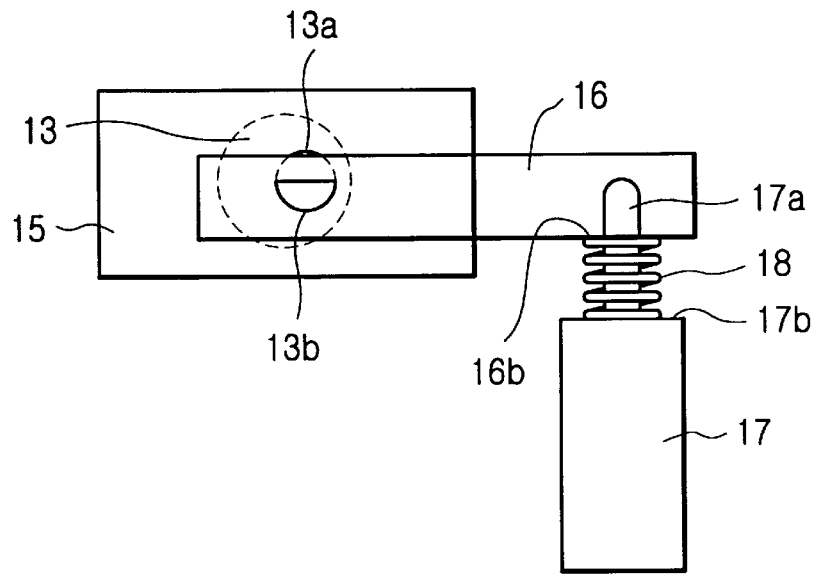
FIG. 6 is a front view illustrating the chamfer unit of a slide shaft.

A multifunctional machine as constructed according to the principles of the first embodiment of the present invention is shown in FIGS. 4 through 6. At one end of scanning sensor module 11, timing belt 12 is attached to move the scanning sensor module along slide shaft 13. The other end of the scanning sensor module is attached to guide rail 14. Both ends of slide shaft 13 are rotatably fixed to the frame 15 and 15' of the multifunctional machine. At one end of slide shaft 13 an eccentrically positioned shaft is attached. Eccentric shaft 13a is rotatably inserted through frame 15 so that slide shaft 13 can be rotated.

Chamfer unit 13b is attached to an end of eccentrically located shaft 13a to securely engage the eccentrically located shaft with rotary lever 16. One end of the rotary lever is attached to the eccentric via the chamfer unit and the second end of the rotary lever is attached to solenoid 17. Solenoid 17 is connected via operating shaft 17a to the rotary lever. Thus, when the solenoid is activated, i.e. turned 'on', the rotary lever is moved via the operating shaft. This causes the rotary lever to rotate around the eccentrically located shaft and forces slide shaft 13 to rotate in an eccentric manner. This results in the scanning sensor module being moved to a second position. The second position is preferably spaced a half pixel width apart from the first scanning sensor module position along the main scanning axis. When positioning the eccentrically located shaft on the end of slide shaft 13, the correct placement is calculated depending on the desired separating distance between the first position and the second position of the scanning sensor module. Coil spring 18 is mounted over operating shaft 17a and attached to both the solenoid, along surface 17b, and to the rotary lever, along surface 16b, to elastically bias the rotary lever into a first lever position, resulting in said scanning sensor module being in a first position whenever the solenoid is not turned 'on'.

Figure 7:
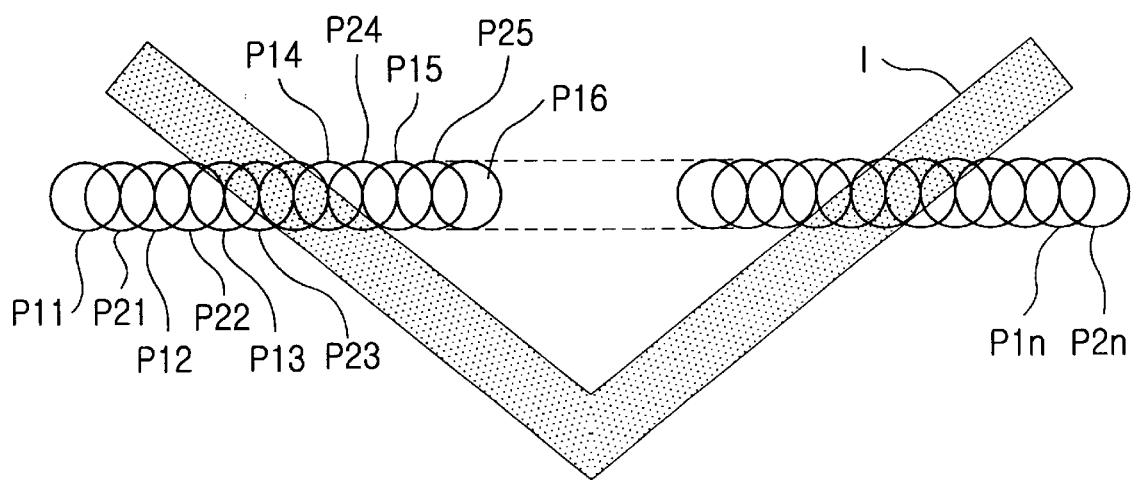
FIG. 7 is a view illustrating the position where a sensor reads image data during scanning in accordance with the principles of the present invention.

FIG. 7 illustrates the improved image data collection that results from using the apparatus and method of the present invention. When the scanning operation begins, scanning sensor module 11 moves one incremental step along the sub scanning axis to any point above the document in the multifunctional machine. Then, one line of image data is scanned and data representing pixels P11, P12, P13, P14, P15, . . . , P1n is read and stored by the scanning sensor module.

After scanning the line while moving in one direction along the main scanning axis, solenoid 17 is turned on. This causes operating shaft 17a to pull one end of rotary shaft 16 and thus, rotates slide shaft 13 in an eccentric manner. The eccentric rotation of slide shaft 13 is possible because of the eccentric position of eccentrically located shaft 13a.

When slide shaft 13 is rotated, scanning sensor module 11 is moved into a second position along the main scanning axis. Preferably, scanning sensor module 11 is moved by a half pixel distance along the main scanning axis while going from a first position to a second position. Then, the scanning sensor module is moved in a second direction along the main scanning axis, opposite from the first direction, while reading image data representing pixels P21, P22, P23, P24, P25, . . . P2n. The thick black line denoted 1 represents the light reflected off of a black, or another color, surface. As can be seen when comparing FIG. 7 to FIG. 2, the amount of erroneously recorded image data is going to be dramatically reduced. While a mis-reading may occur during the first pass of the scanning sensor module, the inaccuracy will probably be corrected when the scanning sensor module rescans the line while in an offset position, i.e. the second position. This results in an increase in the image data collected and a corresponding increase in the resolution of the scanned image.

When the scanning of pixels P21, P22, P23, P24, P25, . . . , P2n is completed, solenoid 17 is turned off again, and operating shaft 17a of the solenoid 17 is returned to an initial position by the elasticity of coil spring 18. Rotary lever 16 and scanning sensor module 11 also return to their initial positions. Then, the next line is scanned and the above operation is repeatedly performed until the document is completely scanned.

Figure 8:
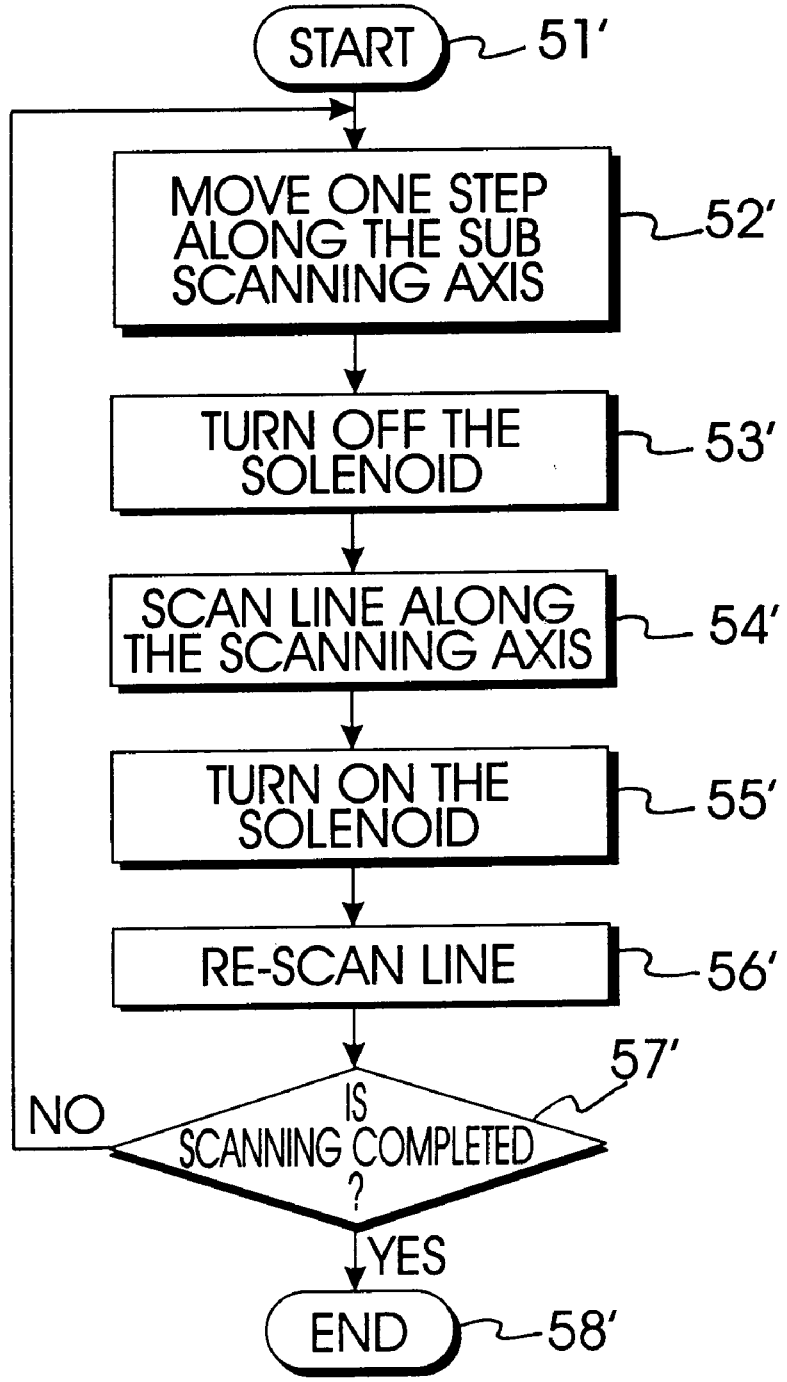
FIG. 8 is a flowchart illustrating a scanning operation in accordance with the principles of the present invention.

A method of scanning according to the principles of the present invention is shown in FIG. 8. When, during step S1', the scanning operation is started, the scanning module moves to any point along the sub scanning axis above the document. Then, during step S2' the scanning sensor module moves one incremental step in the sub scanning direction. After, in step S3', the scanning device makes sure that the solenoid is turned 'off' to ensure that the scanning sensor module is in a first position. Then, during step S4', the scanning sensor module moves across the paper, along the main scanning axis, while 'reading' a line of image data from the document. After the line of image data has been scanned, the solenoid activates, during step S5', and causes the scanning sensor module to move into a second position. After, in step S6', the scanning sensor module re-scans the same line while moving along the main scanning axis in a direction opposite from that moved in during step S4'. Then in step S7' the scanning device determines whether the document has been completely scanned. If the document scan is not finished, then the scanning device returns to step S2'. If the document scan is finished then the scanning device moves on to step S8' and ends the scanning process.

Figure 9:
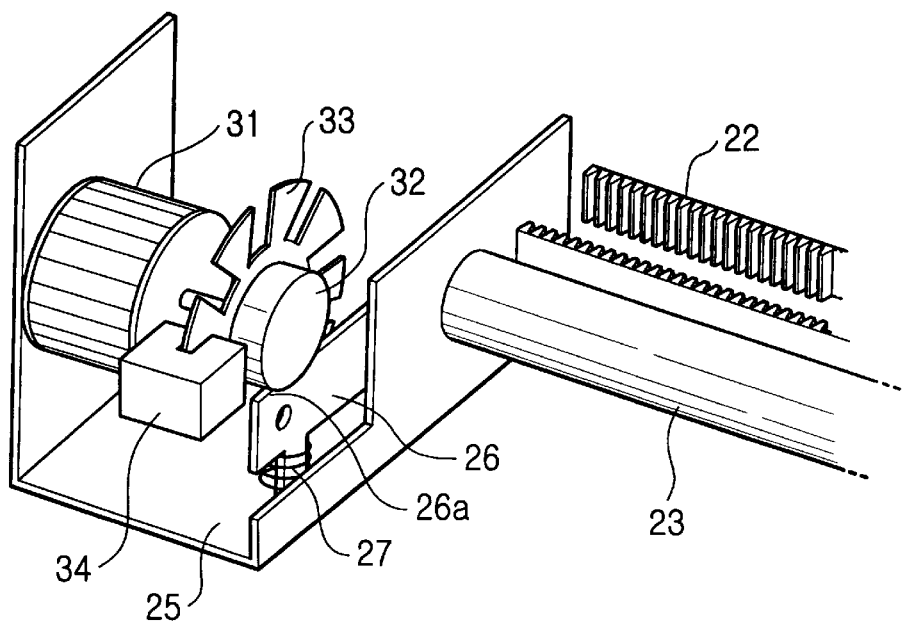
FIG. 9 is a perspective view enlarging a main portion of the scanning device according to a second embodiment of the present invention.
Figure 10:
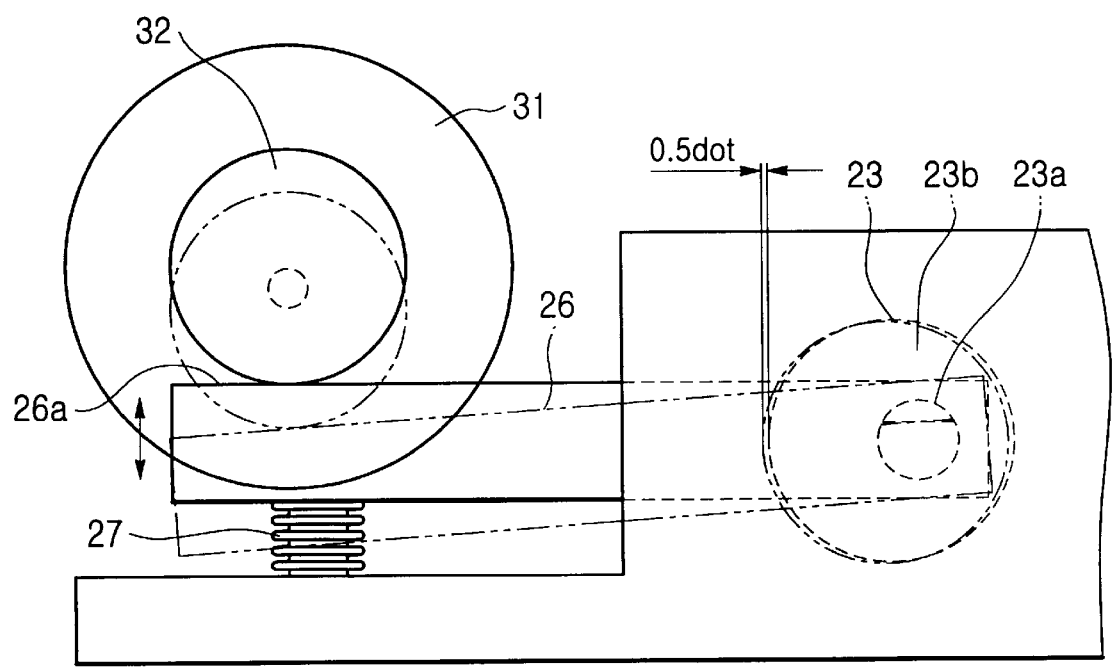
FIG. 10 is a front view illustrating the shape of a cam.

FIGS. 9 and 10 illustrate a second embodiment of the present invention. Eccentrically located shaft 23a of slide shaft 23 is rotatably fixed to frame 25. Frame 25 has a C-shaped cross-section. Chamfer unit 23b of eccentrically located shaft 23a, is fitted to one end of rotary lever 26. Coil spring 28 is attached to the rotary lever to bias it in a first lever position.

Along upper side 26a of rotary lever 26, eccentric cam 32 is mounted so as to contact the upper surface of rotary lever 26. Cam 32 is rotated by motor 31 to cause the rotary lever to be compressed in an oscillatory manner.

Encoder slit 33 is mounted on cam 32, and encoder sensor 34 is located at one side of encoder slit 33 to sense the rotating position of motor 31 via the rotational position of encoder slit 33. Motor 31 and encoder sensor 34 are fixed to frame 25. Reference numeral 22 denotes the timing belt.

The second embodiment of the present invention operates in the following manner. When the multifunctional machine begins the scanning operation, scanning sensor module 11 moves to any line along the sub scanning axis and begins to scan one line of image data from the document. At this time, the scanning sensor module is in a first scanning position and motor 31 is turned off.

After scanning sensor module 11 scans the pixel data located along the first document line, power is supplied to motor 31 and cam 32 rotates to cause the scanning sensor module to move into a second position. Due to the rotation of eccentrically located shaft 23a, slide shaft 23 is rotated from a position shown by a dotted line in FIG. 10 to a position depicted by a two-dot chain line, also shown in of FIG. 10. Slide shaft 23 moves by a half pixel, thus adjusting the position of the scanning sensor module 11.

Scanning sensor module 11 moves and scans the pixels located at each document position at least twice. The relationship between an encoder signal and a scanning time is illustrated in FIG. 11.

Figure 11:
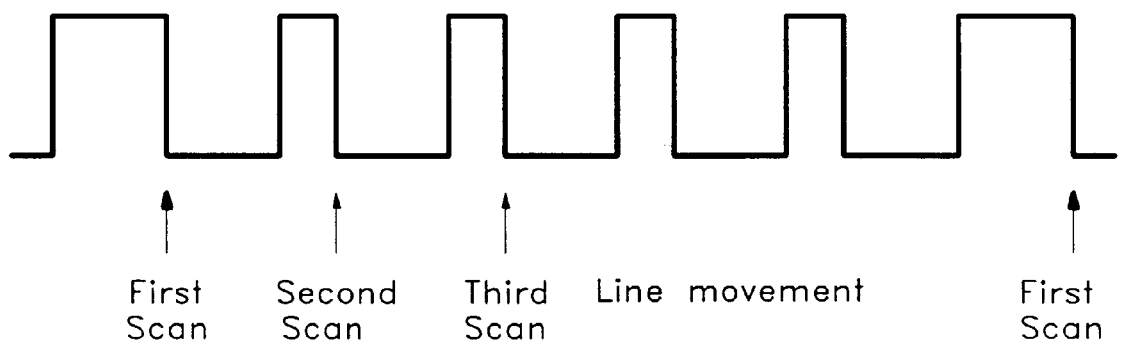
FIG. 11 is a view illustrating a relationship between the scanning time and an encoder signal in accordance with the scanning device of FIG. 9.

As shown in FIG. 11, the scanning of one line can be performed many times. Since the scanning along the main scanning axis is performed at least twice, the total amount of data collected is increased at least twice, thereby increasing the resolution of the image that is recorded along the main scanning axis.

As detailed above, the scanning method of the present invention increases the amount of image data collected by the scanning sensor module and thereby increases the resolution of the scanned image. The apparatus of the present invention requires only one scanning sensor module thus avoiding increasing costs and complexity while still improving the resolution of scanned images along the main scanning axis. The apparatus of both the first and second embodiments utilizes components that are simpler to assemble and manufacture in an economical fashion.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A method of scanning a document in a multifunctional machine having a scanning sensor module, said method comprising the steps of:

scanning a line to record a first line of image data in a pixel format from said document, while moving said scanning sensor module in a first direction along a main scanning axis;

re-scanning said line in a second direction, opposite from said first direction, to record a second line of image data;

said first line of image data being offset from said second line of image data by a predetermined distance along said main scanning axis; and said multifunctional machine using both said first line of image data and said second line of image data to reduce image data loss and to enhance the resolution of the scanned document along the main scanning axis.

2. The method of claim 1, further comprising a carriage apparatus for moving said scanning sensor module between a first position and a second position, said carriage apparatus mounted on a slide shaft for guiding movements of said scanning sensor module, said slide shaft rotatably mounted at first and second ends thereof to a frame portion of said multifunction machine, said carriage apparatus comprising:

a rotary lever attached to one of said first and second ends of said slide shaft;

a solenoid attached to said rotary lever for rotating said rotary lever to rotate said slide shaft;

an elastic member attached to both said solenoid and said rotary lever for biasing said rotary lever in a first lever position while said solenoid is not activated; and said solenoid activating to move said scanning sensor module into said second position via rotating both said rotary lever and said slide shaft.

3. The method of claim 2, with said apparatus further comprising:

a second shaft eccentrically positioned on said end of said slide shaft; and said rotary lever attached to said second shaft.

4. The method of claim 3, with said second shaft having a chamfer unit for engaging said rotary lever.

5. The method of claim 1, further comprising a carriage apparatus for moving said scanning sensor module between a first position and a second position, said carriage apparatus mounted on a slide shaft for guiding movements of said scanning sensor module, said slide shaft rotatably mounted at first and second ends thereof to a frame portion of said multifunction machine, said carriage apparatus comprising:

a rotary lever attached to a one of said first and second ends of said slide shaft;

an eccentric cam contacting said rotary lever to rotate said rotary lever in an oscillatory manner;

a motor driving eccentric cam; and said motor driving said eccentric cam to move said scanning sensor module between said first position and said second position via said rotary lever and said slide shaft.

6. The method of claim 5, with said apparatus further comprising:

a second shaft eccentrically positioned on said end of said slide shaft; and said rotary lever attached to said second shaft.

7. The method of claim 6, with said second shaft having a chamfer unit for engaging said rotary lever.

8. The method of claim 5, with said apparatus further comprising an elastic member biasing said rotary lever in said first lever position.

9. The method of claim 5, with said apparatus further comprising:

an encoder slit mounted on said eccentric cam; and an encoder sensor contacting said encoder slit for sensing a rotational position of said eccentric cam via a position of said encoder slit.

10. The method of claim 1, further comprising said predetermined distance being one half a diameter of a pixel.

11. A scanning device comprising:

means for moving a scanning sensor module along a sub scanning axis;

means for moving said scanning sensor module along a main scanning axis; and an apparatus allowing a first line of image data and a second line of image data to be recorded, said second line offset from said first line by a predetermined distance along said main scanning axis, said apparatus comprising:

a slide shaft for guiding movements of said scanning sensor module, said slide shaft rotatably mounted at first and second ends thereof to a frame portion of said scanning device;

a rotary lever attached to a one of said ends of said slide shaft;

a solenoid attached to said rotary lever for rotating said rotary lever to rotate said slide shaft; and said solenoid activating to offset said scanning sensor module by said predetermined distance, whereby said second line of image data is offset by said predetermined distance from said first line of image data.

12. The scanning device of claim 11, with said apparatus further comprising:

a second shaft eccentrically positioned on said end of said slide shaft; and said rotary lever attached to said second shaft.

13. The scanning device of claim 11, with said apparatus further comprising an elastic member attached to both said solenoid and said rotary lever for biasing said rotary lever in a first lever position while said solenoid is not activated.

14. The scanning device of claim 11, with said predetermined distance being equal to a half of a diameter of a pixel.

15. A scanning device comprising:

means for moving a scanning sensor module along a sub scanning axis;

means for moving said scanning sensor module along a main scanning axis; and an apparatus allowing a first line of image data and a second line of image data to be recorded, said second line offset from said first line by a predetermined distance along said main scanning axis, said apparatus comprising:

a slide shaft for guiding movements of said scanning sensor module, said slide shaft rotatably mounted at first and second ends thereof to a frame portion of said scanning device;

a rotary lever attached to a one of said ends of said slide shaft;

an eccentric cam contacting said rotary lever to rotate said rotary lever in an oscillatory manner;

a motor driving said eccentric cam; and said motor driving said eccentric cam to offset said scanning sensor module from said first line by said predetermined distance, whereby said second line of image data is offset by said predetermined distance from said first line of image data.

16. The scanning device of claim 15, with said apparatus further comprising:

a second shaft eccentrically positioned on said end of said slide shaft; and said rotary lever attached to said second shaft.

17. The scanning device of claim 16, with said second shaft having a chamfer unit for engaging said rotary lever.

18. The scanning device of claim 15, with said apparatus further comprising an elastic member attached to said rotary lever for biasing said rotary lever in a first lever position.

19. The scanning device of claim 15, with said predetermined distance being a half a diameter of a pixel.

20. The scanning device of claim 15, with said apparatus further comprising:

an encoder slit mounted on said eccentric cam; and an encoder sensor contacting said encoder slit for sensing a rotational position of said eccentric cam via a position of said encoder slit.

* * * * *